(12) United States Patent
Andres et al.

(10) Patent No.: US 8,264,199 B2
(45) Date of Patent: Sep. 11, 2012

(54) INTERCHANGEABLE ACCUMULATOR UNIT

(75) Inventors: Jorg Andres, Neustadt (DE); Dirk Reymann, Hambuhren (DE); Wolfgang Mann, Isernhagen (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 742 days.

(21) Appl. No.: 12/294,236

(22) PCT Filed: Mar. 23, 2007

(86) PCT No.: PCT/EP2007/052811
§ 371 (c)(1),
(2), (4) Date: Feb. 11, 2009

(87) PCT Pub. No.: WO2007/110390
PCT Pub. Date: Oct. 4, 2007

(65) Prior Publication Data
US 2009/0200990 A1 Aug. 13, 2009

(30) Foreign Application Priority Data
Mar. 24, 2006 (DE) .......................... 10 2006 014 177

(51) Int. Cl.
*H02J 7/00* (2006.01)
(52) U.S. Cl. ...................................... 320/112; 320/107

(58) Field of Classification Search .................. 320/107, 320/112, 113, 115; 324/435
See application file for complete search history.

(56) References Cited

U.S. PATENT DOCUMENTS

| 5,216,371 A * | 6/1993 | Nagai ........................... 324/428 |
| 5,694,021 A * | 12/1997 | Morioka et al. .............. 320/106 |
| 6,777,910 B2 * | 8/2004 | Small ............................ 320/106 |
| 6,873,135 B2 * | 3/2005 | Nakatsuji ..................... 320/132 |
| 2002/0001745 A1 * | 1/2002 | Gartstein et al. ............... 429/61 |
| 2006/0226814 A1 * | 10/2006 | Formenti et al. .............. 320/128 |

FOREIGN PATENT DOCUMENTS

| CN | 1658409 A | 11/2004 |
| DE | 29610085 U1 | 8/1996 |
| DE | 29817827 | 2/1999 |
| DE | 102004008569 A1 | 9/2005 |
| EP | 0779693 A1 | 6/1997 |
| GB | 2411287 A | 8/2005 |
| WO | WO 02/45236 A2 | 6/2002 |
| WO | WO 2005/072548 | 8/2005 |

* cited by examiner

*Primary Examiner* — Arun Williams
(74) *Attorney, Agent, or Firm* — Kilpatrick Townsend & Stockton LLP

(57) ABSTRACT

Provision is made for an interchangeable accumulator unit comprising a housing (10, 20) and a lithium accumulator cell (40) arranged in the housing. Provision is further made in the housing of the accumulator unit for a charging circuit (50) for controlling the charging process of the lithium accumulator cell (40). Provision is made on the housing (10, 20) for at least one first charging contact unit (100, 200).

11 Claims, 10 Drawing Sheets

INTERCHANGEABLE ACCUMULATOR UNIT

CROSS-REFERENCE TO RELATED APPLICATIONS

Figure 1:
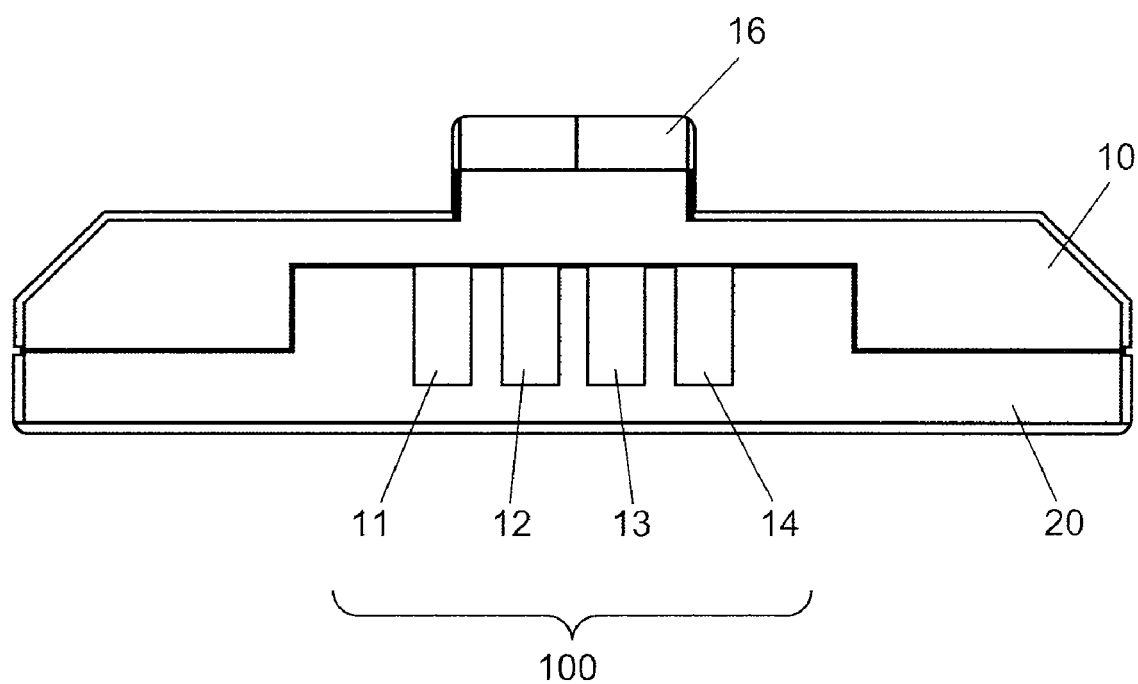

This application is a National Stage of International Application No. PCT/EP2007/052811, filed Mar. 23, 2007, and which claims the benefit of German Patent Application No. 102006014177.6, filed Mar. 24, 2006 the disclosure of both applications being incorporated by reference.

The instant invention relates to an interchangeable accumulator unit, a portable electronic device and a charging station.

Interchangeable accumulator units are used in all current portable electronic devices, such as mobile telephones, PDAs or the like, for example. Their interchangeability ensures that a defective accumulator unit can be replaced.

DE 10 2004 008 569 A1 shows an intrinsically safe power supply for underground mining. An interchangeable accumulator unit comprising a housing and a lithium accumulator cell are shown hereby. Provision is further made in the housing for a protective circuit as well as for a charging circuit.

DE 298 17 827 U1 shows a wireless telephone comprising an accumulator as power supply. However, the accumulator is not designed so as to be interchangeable.

DE 296 10 085 U1 shows an accumulator unit comprising a housing and interchangeable accumulator cells as well as at least one charging contact.

WO 2005/072548 A1 shows an electrically heatable insole. The insole thereby encompasses a heating electrode and a chargeable battery and a chargeable accumulator cell, respectively, which are electrically connected to the insole. The accumulator cell is hereby not designed so as to be interchangeable.

It is the object of the instant invention to provide for an accumulator unit, which can be interchanged to an improved extent, and for a corresponding charging station.

This object is solved by means of an interchangeable accumulator unit according to claim 1 and by means of a charging station according to claim 8.

Provision is thus made for an interchangeable accumulator unit comprising a housing and at least one lithium accumulator cell arranged in the housing. Provision is further made in the housing of the accumulator unit for a charging circuit for controlling the charging process of the lithium accumulator cell. Provision is made on the housing for at least one first charging contact unit.

According to an aspect of the instant invention, the accumulator unit encompasses a charging contact unit on the lower side of the housing and/or on a front side of the housing. Provision is thus made for two charging contact units so that the accumulator unit can be charged in different arrangements.

According to a preferred aspect of the instant invention, the charging contact unit encompasses a ground closure, a positive connection for connecting the charging voltage, a positive connection for providing a supply voltage of the accumulator cell and a status contact. The positive connection for the charging voltage is connected to the charging circuit. The accumulator unit can be used for the voltage supply via the positive connection of the accumulator unit.

The instant invention also relates to a portable electronic device, which encompasses an interchangeable accumulator unit.

The invention also relates to a charging station for an accumulator unit. The charging station encompasses a first shaft for accommodating an accumulator unit. The charging station further encompasses a charging box for accommodating a portable electronic device comprising an accumulator unit and for charging the interchangeable accumulator unit located therein.

Further embodiments of the invention are the object of the subclaims.

The exemplary embodiments and advantages of the instant invention will be defined in more detail below with reference to the enclosed drawings.

Figure 2:
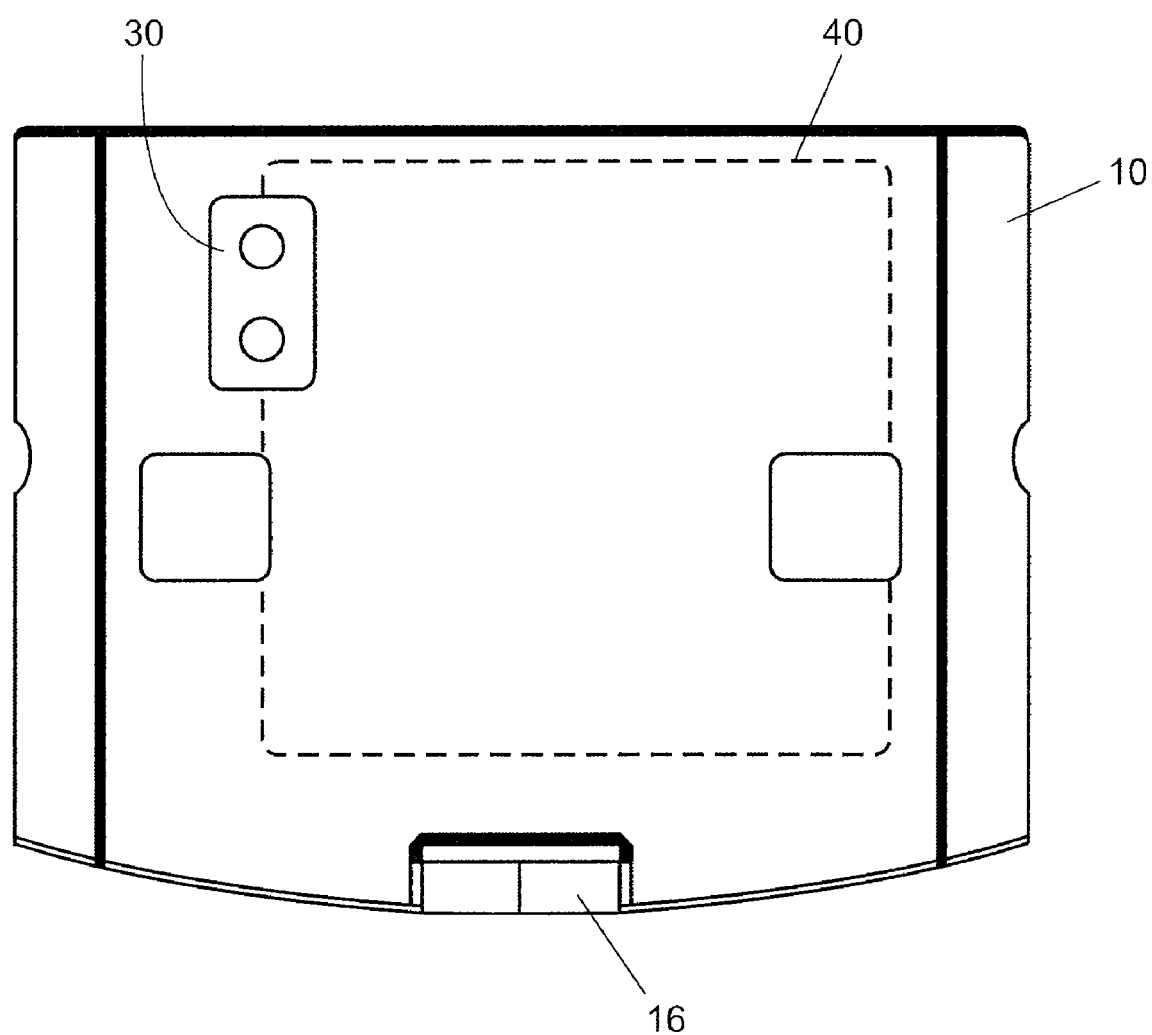
Figure 3:
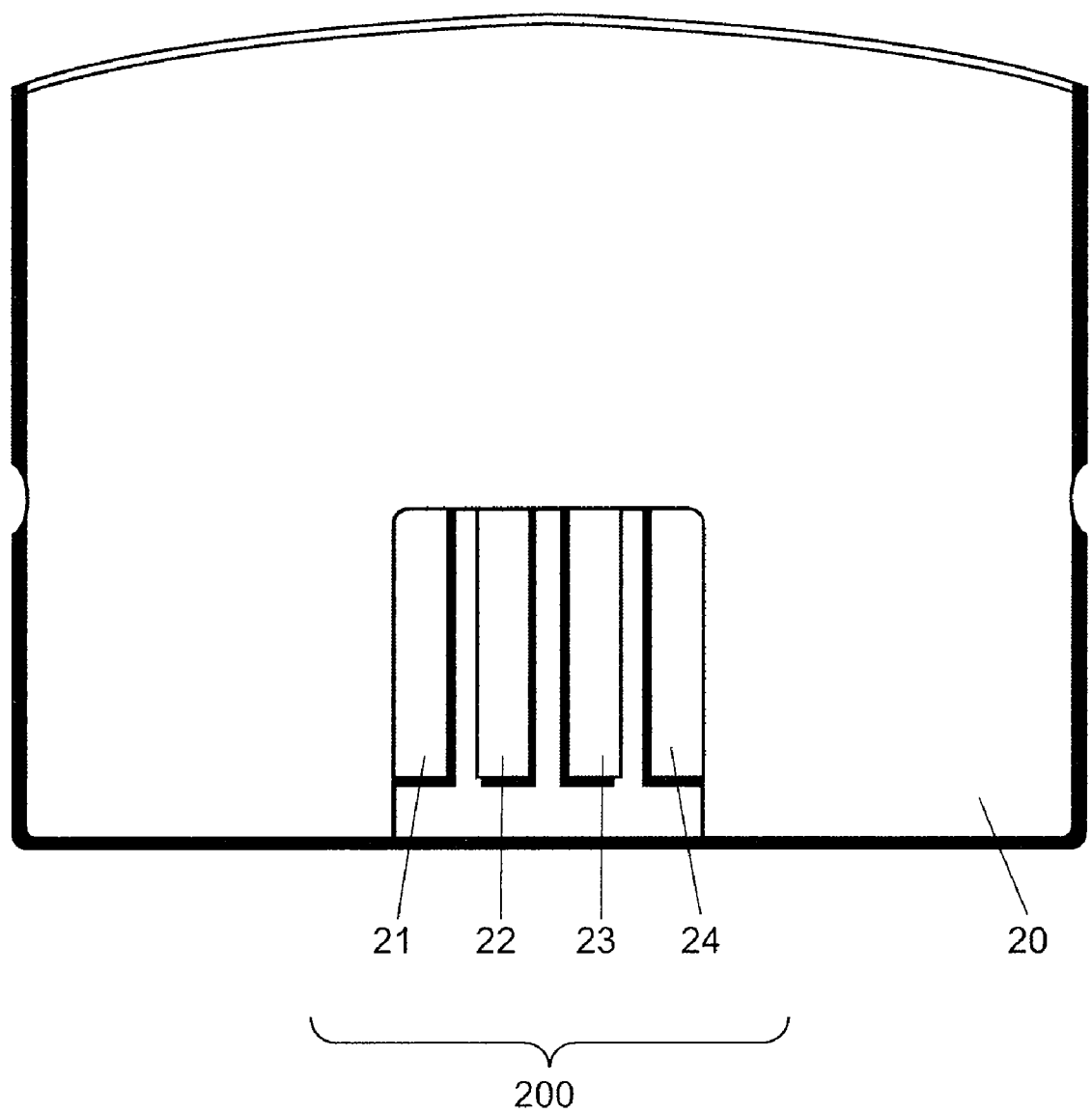
Figure 4:
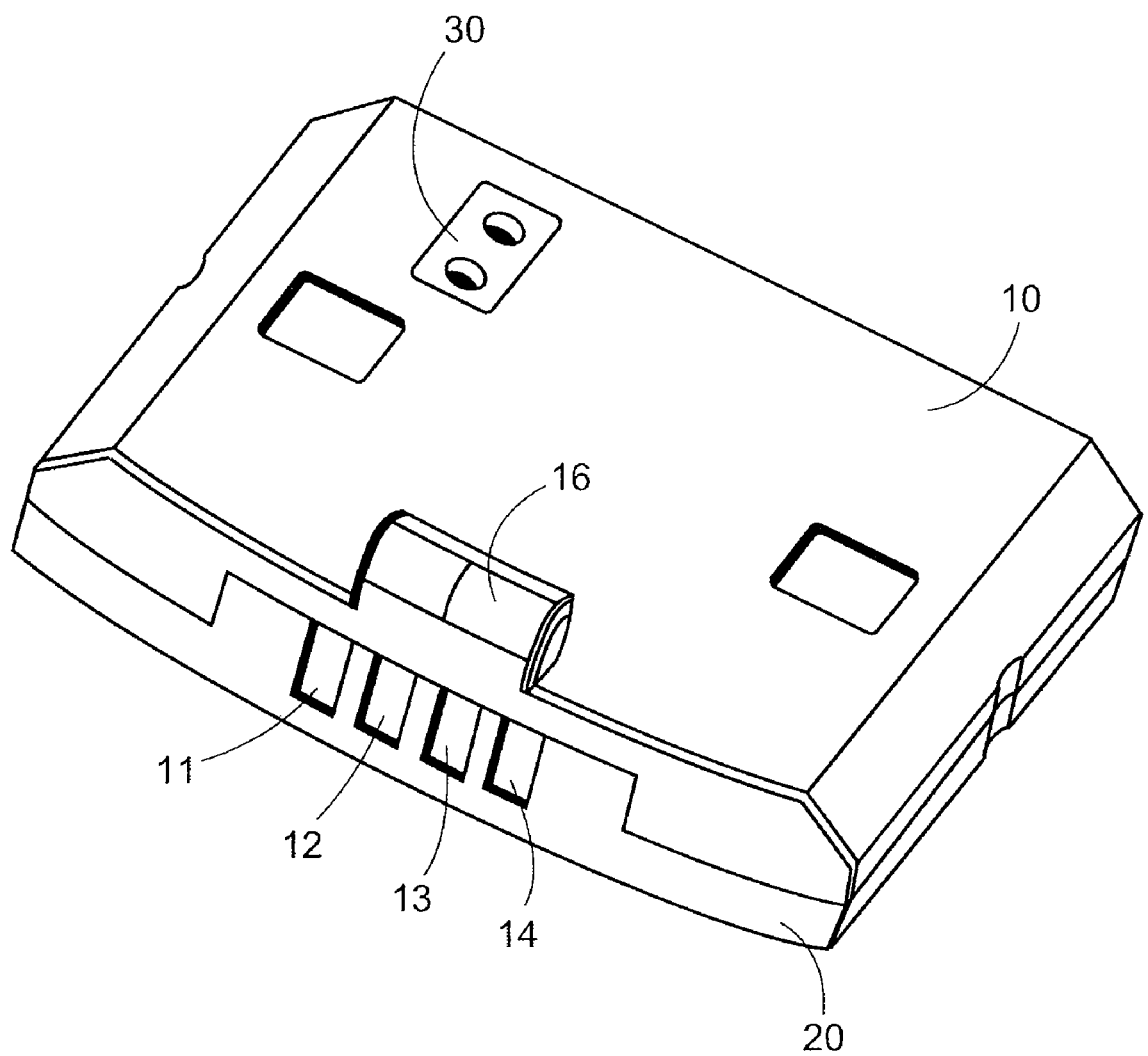
Figure 5:
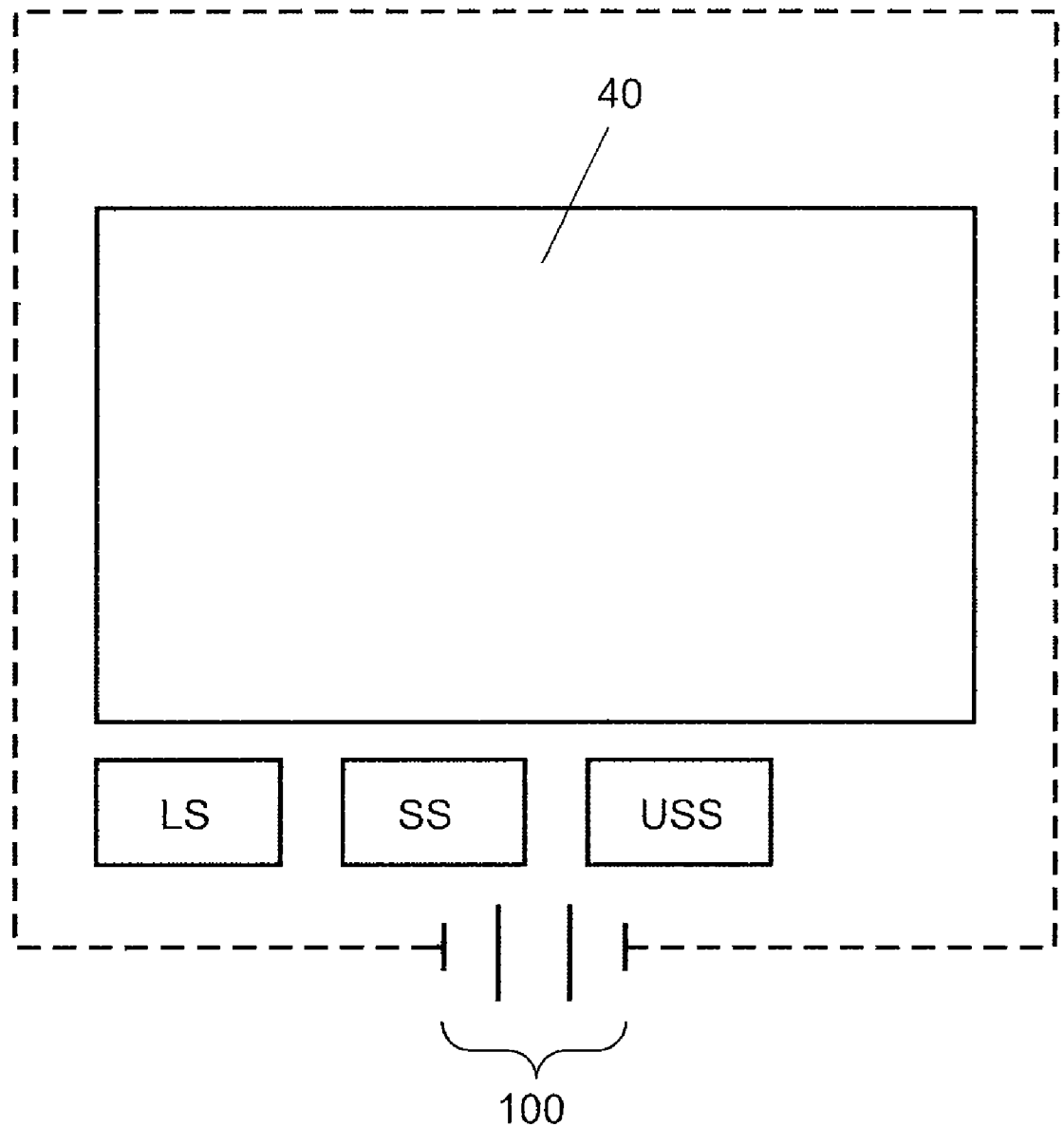
Figure 6:
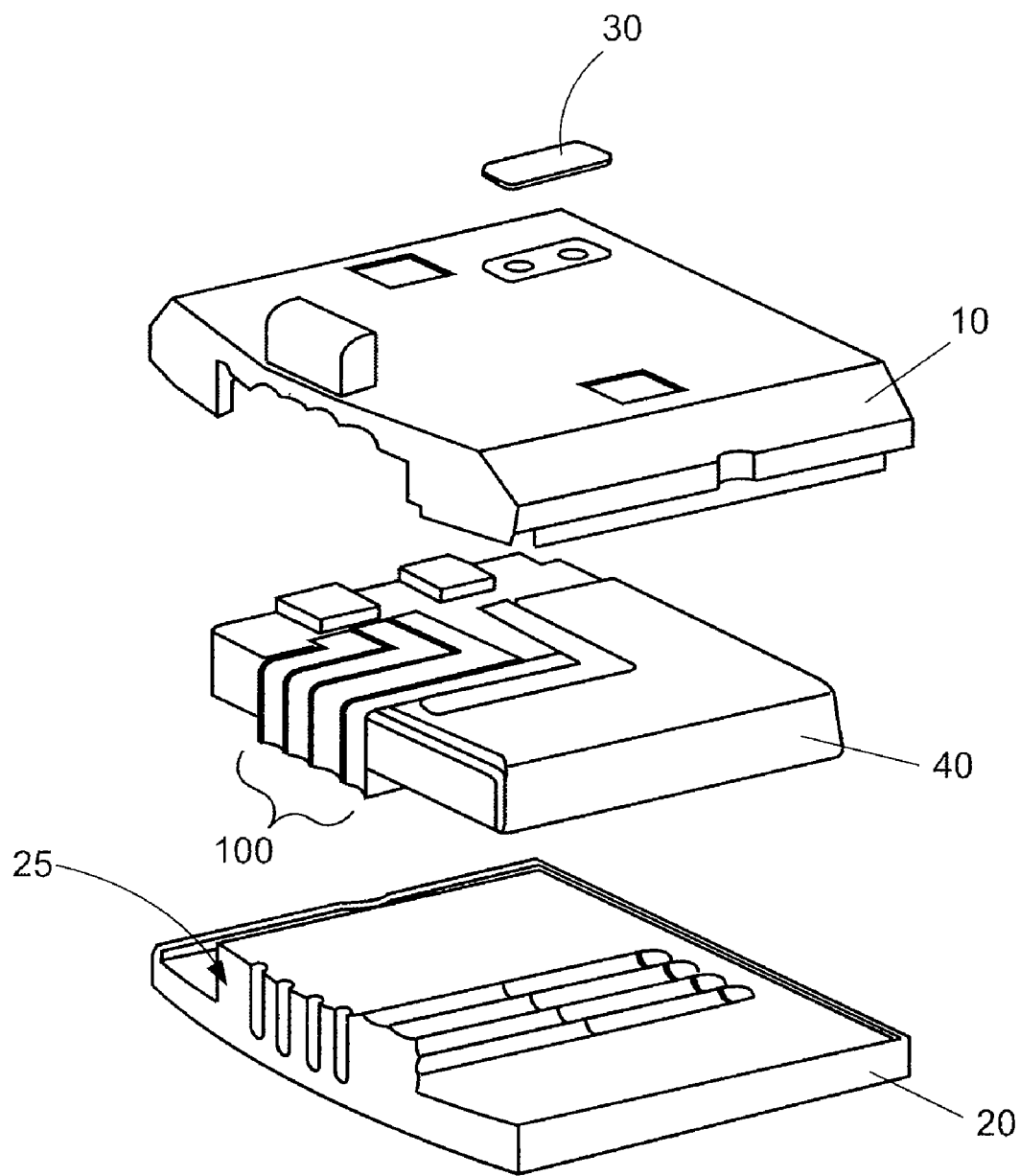
Figure 7:
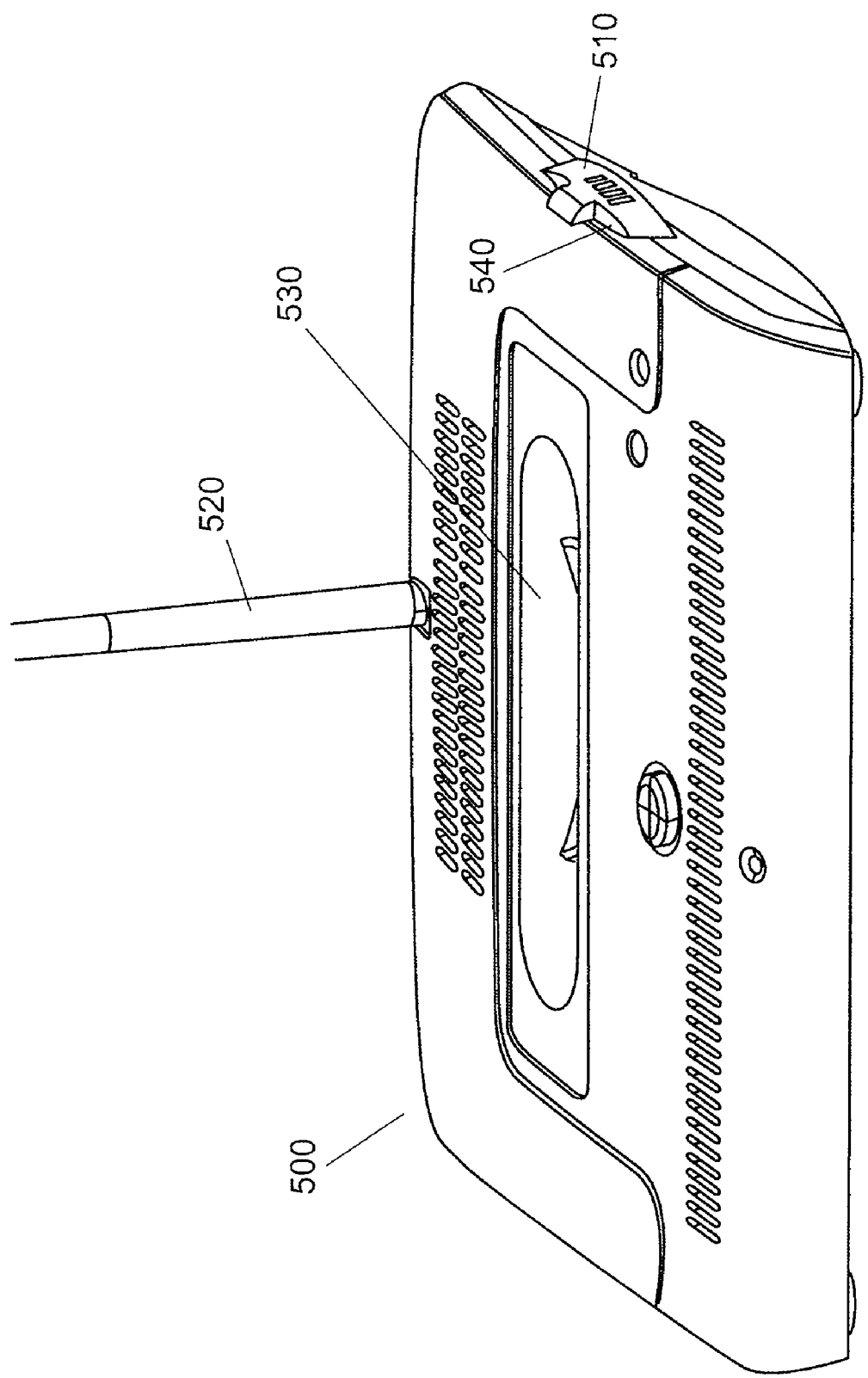
Figure 8:
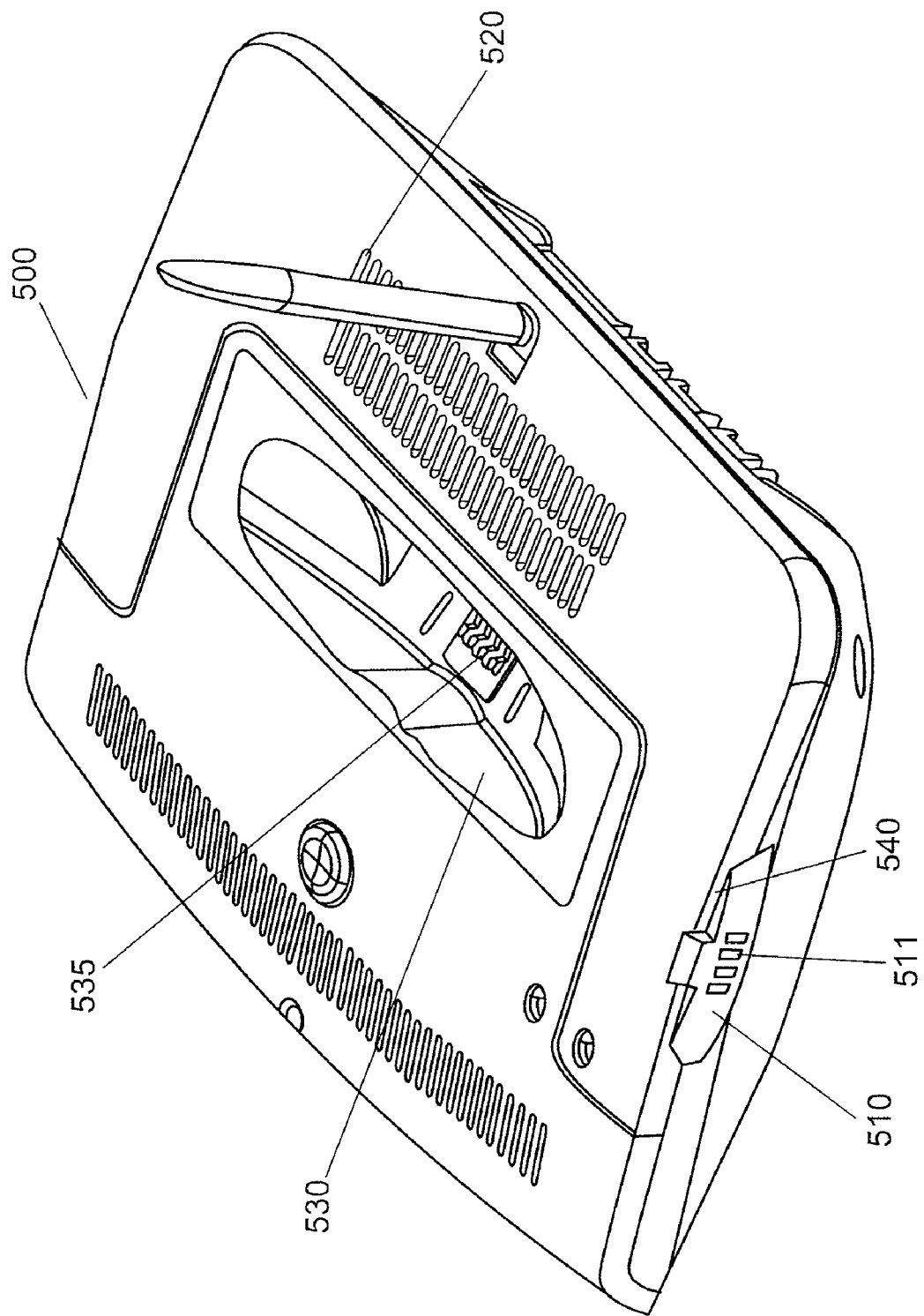
Figure 9:
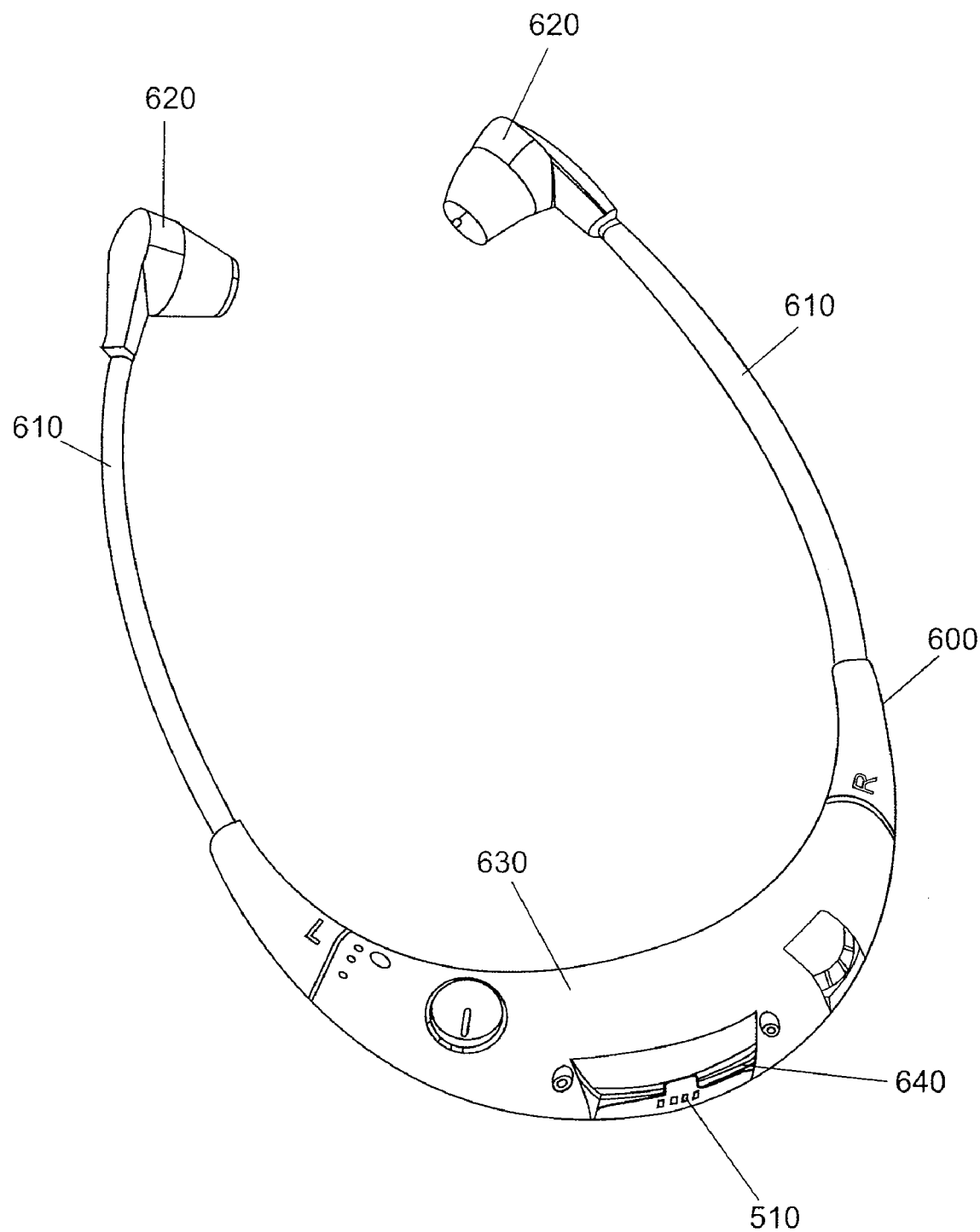
Figure 10:
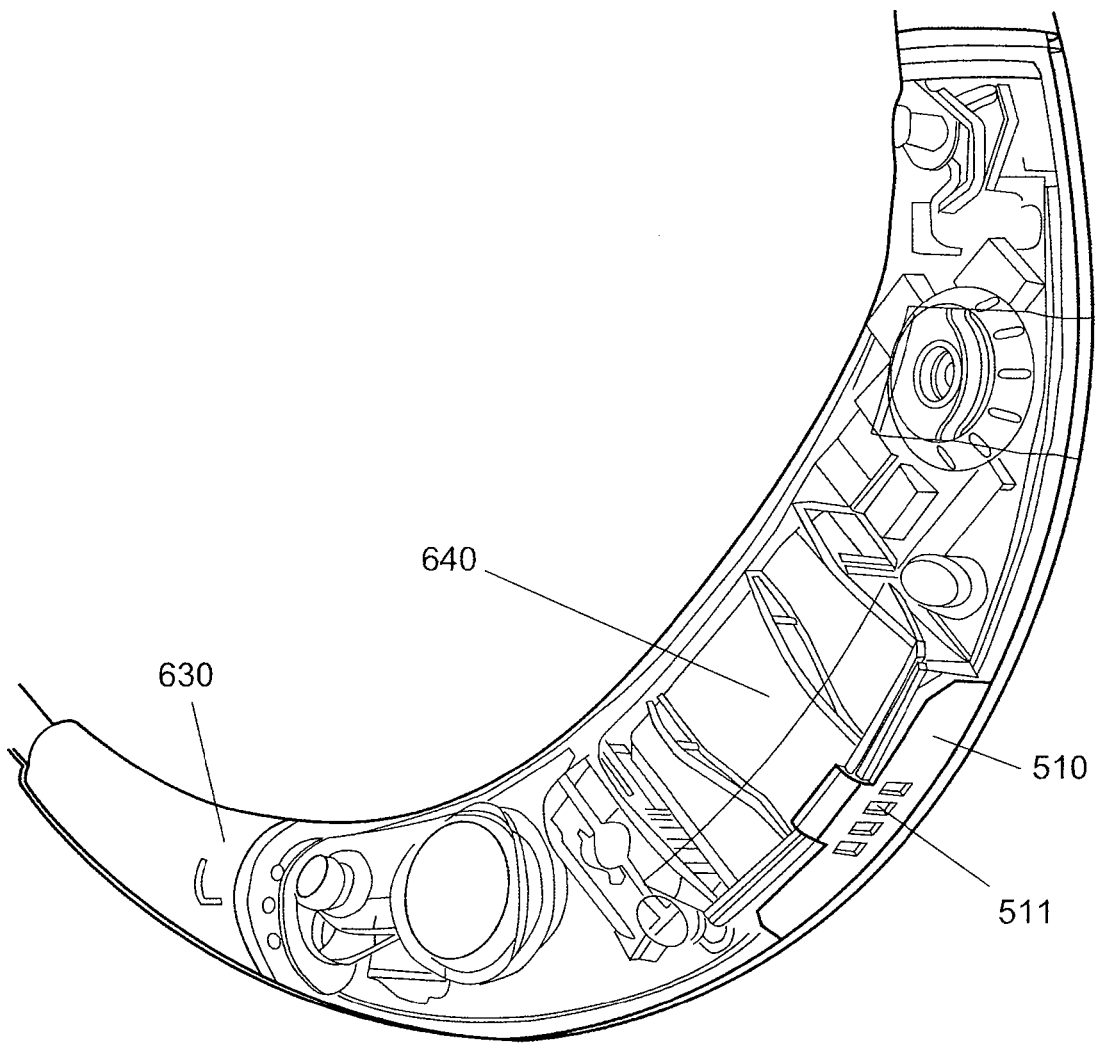

FIG. 1 shows a side view of an accumulator unit according to a first exemplary embodiment, FIG. 2 shows a top view onto the accumulator unit of FIG. 1, FIG. 3 shows a view of the lower side of the accumulator unit of FIG. 1, FIG. 4 shows a further view of the accumulator unit of FIG. 1, FIG. 5 shows a diagrammatic view of the electrical components of the accumulator unit of FIG. 1, FIG. 6 shows a diagrammatic illustration of the accumulator unit of FIG. 1, FIG. 7 shows a perspective view of a charging station according to a second exemplary embodiment, FIG. 8 shows a further perspective view of the charging station of FIG. 7, FIG. 9 shows a perspective view of an electronic device according to a third exemplary embodiment and FIG. 10 shows an enlarged view of the electronic device of FIG. 9.

FIG. 1 shows a lateral view of the accumulator unit according to a first exemplary embodiment. The accumulator unit encompasses an upper housing part 10 and a lower housing part 20. A first charging contact unit 100 comprising four charging contacts 11, 12, 13 and 14 is arranged on the lower housing part 20. The contact depth of the charging contacts 11 to 14 is between 0.1 mm and 1 mm, preferably 0.5 mm.

FIG. 2 shows a view onto an accumulator unit according to the first exemplary embodiment of FIG. 1. In particular, a top view onto the upper housing part 10 of the accumulator unit is shown here. A test point label 30 as well as a lug 16 is arranged on the upper housing part 10.

FIG. 3 shows a further view of the accumulator unit of FIG. 1. A view of the lower housing part 20 is shown here. A second charging contact unit 200 comprising four charging contacts 21, 22, 23 and 24 is arranged in the lower housing part 20. These charging contacts 21 to 24 are in each case coupled to the charging contacts 11 to 14.

The upper housing part 10 and the lower housing part 20 enclose a lithium polymer accumulator cell 40. The housing consisting of the upper part 10 and the lower part 20 encompasses two different contacting planes and a first and second charging contact unit 100, 200, respectively. The one contacting plane is located on the lower side, that is, in the lower housing part 20, wherein the second contacting plane is located on the rear side and on a front side of the accumulator unit, respectively. The embodiment of the two charging contact units 100, 200 and of the charging contact planes, respectively, makes it possible for the accumulator unit to be charged accordingly as an individual accumulator in a charging compartment as well as alternatively thereto and in addition thereto, respectively, in a portable electronic device in a charging shaft and in a charging box, respectively.

The accumulator cell 40 encompasses a protective circuit against a short circuit and against an excess voltage. Optionally thereto, provision can also be made in the accumulator unit for a protective circuit against an excess ambient temperature.

Provision is made in or on the accumulator cell for a charging circuit, which controls the charging process of the accumulator cell. This charging circuit can deliver a response relating to the current charging state of the accumulator cell. The charging contact surfaces on the lower side 20 and on the rear side in each case have four charging contact surfaces. These four charging contact surfaces represent ground (mass), + for the charging voltage (the voltage, which is connected to the charging circuit), + for the accumulator cell (as voltage supply) and a status contact. A display in the charging station can be controlled via the status contact 12 so as to display whether a charging process is being carried out or whether the accumulator cell is charged completely. As an alternative and additionally thereto, respectively, the accumulator unit can encompass a display unit, via which a residual capacitance of the accumulator cell can be displayed. This can take place, for example, by means of a time display, a percentaged display or a LED chain.

Due to the provision of the charging circuit within the housing of the accumulator unit, the entire charging intelligence is in the accumulator unit so that a corresponding charging station must only generate a stabilized voltage of approximately 5 Volt.

FIG. 4 shows a perspective view of the accumulator unit of FIG. 1. The upper as well as the lower housing part 10, 20 as well as the first charging contact unit 100 comprising the four charging contact surfaces 11-14 are shown here.

FIG. 5 shows a diagrammatic view of the electrical components of the accumulator unit of FIG. 1. The accumulator cell 40 encompasses a lithium polymer cell LI. A charging circuit LS, a protective circuit SS and optionally an ambient temperature protective circuit USS are arranged in or on the lithium polymer cell. The charging contact unit 11-14 comprising the four charging contacts is accordingly connected to the polymer cell 40. Two different charging contact units are hereby arranged on different housing planes. However, the two charging contact units are electrically connected to one another so that a charging of the accumulator cell 40 can take place via each of the charging contact units.

The charging circuit LS is implemented, for example, as a charge controller for monitoring the charging process of the lithium polymer accumulator cell. Preferably, the charging process initially takes place hereby via a constant current and subsequently via a constant voltage. Preferably, a printed circuit board is arranged next to the accumulator cell and the accumulator cells, respectively. The printed circuit board encompasses the charging circuit LS as well as the protective circuit SS. The protective circuit SS encompasses a monitoring electronic against a short circuit current and against an overvoltage. Due to the implementation of the charging circuit and the charging controller in the housing of the accumulator unit, respectively, the accumulator unit only requires a constant voltage of 5 Volt for the charging process. The remaining control of the charging process takes place by means of the charging circuit LS. The charging contact unit 100 encompasses four charging contact surfaces. In addition to a contact surface for the ground, a plus connection is available, which leads directly from the accumulator cell to the portable electronic device, so as to thus ensure a power supply for the housing (+ for the accumulator cell). In addition thereto, provision is made for a further contact surface, which is coupled to the charging circuit LS. Typically, this voltage encompasses 5 Volts and represents the input voltage for the charging circuit LS. From this input voltage of approx. 5 Volt, the charging circuit LS generates the constant charging current and the constant charging voltage, by means of which the accumulator cells are charged. As is already indicated above, provision is made for a contact surface for the positive voltage of the accumulator cell, by means of which the portable electronic device is supplied with power so that the accumulator unit is used as voltage source. The status contact is coupled to the charging circuit LS, which is either switched to plus or to ground. This information can be requested via the status contact. These two operating states (+ and supply voltage, respectively, and ground) are assigned to a charging state on the one hand and to a completely charged state on the other hand. The information whether the accumulator cell is being charged or has already been charged can be passed on via the status contact so that this can be displayed accordingly in or on a charging station.

The charging contact surfaces are provided on the front face as well as on the lower side of the accumulator unit. The charging contacts are thereby preferably embodied as a profiled steel sheet piece, which provides for two different contact planes (front side, lower side) of the accumulator unit. The accumulator unit can thus be charged from its front side as well as from its lower side.

FIG. 6 shows a diagrammatic view of the accumulator unit of FIG. 1. The upper housing part 10, the accumulator cell 40 and the lower housing part 20 are thereby shown in particular. On the rear side, the lower housing part 20 encompasses several lugs, into which the first charging contact unit can be inserted in such a manner that the different charging contact surfaces are placed between the lugs 25. Provision is made in the lower housing part 20 for further recesses so that a contacting of the charging contact surfaces is also possible on the lower side of the housing.

FIG. 7 shows a perspective view of a charging station according to a second exemplary embodiment. The charging station is preferably provided in a housing 500 of a transmission unit for wirelessly transmitting to a portable electronic receiving unit. Provision is made in the housing 500 for a charging shaft 540 for the interchangeable accumulator units 510 according to the first exemplary embodiment. Preferably, this charging shaft is arranged on a side surface of the housing 500. On the supper side of the housing 500, a charging box 530 is preferably arranged. A portable electronic receiving device can be placed on the changing cavity so as to charge an interchangeable accumulator unit, which is located therein.

FIG. 8 shows a further perspective view of the charging station of FIG. 7. Provision is made in the charging box 530 for electrical contacts 535, which can interact with the contact surfaces of interchangeable accumulator units in a portable electronic device in such a manner that the interchangeable accumulator unit is charged. Provision is made on the side of the housing 500 for the charging shaft 540, in which an interchangeable accumulator unit according to the first exemplary embodiment can be placed so as to thus be charged. The charging contact surfaces 511 are illustrated in FIG. 8 on the front side of the interchangeable accumulator unit. When the interchangeable accumulator unit 510 is inserted into the charging shaft 540, this accumulator unit is charged via the charging contacts located on the lower side, as they have been described according to the first exemplary embodiment. Accordingly, provision is made in the charging shaft 540 for electrical contacts 545, which interact with the charging contact surfaces on the lower side of the accumulator unit. The charging shaft 540 is thereby preferably embodied in such a manner that the interchangeable accumulator units according to FIG. 1, that is, according to FIGS. 1 to 6, can be inserted so as to face upwards only with the lug 16 so that it can be ensured that the interchangeable accumulator unit is always inserted in the right direction.

FIG. 9 shows a perspective view of a portable electronic receiving unit according to a third exemplary embodiment. The portable electronic receiving unit encompasses a housing 630 as well as two stethoset arms 610 in each case comprising an electroacoustic transducer 620 at the end thereof. Provision is made on the lower side of the housing 630 for a shaft 640, into which the interchangeable accumulator unit 510 can be inserted so as to provide for the power supply for the wireless portable receiving device. Provision is made in the shaft 640 for electrical contacts, which can interact with the charging contact surfaces of the interchangeable accumulator unit so that the accumulator unit can be used as voltage supply.

FIG. 10 shows a further perspective view of a section of the portable receiving unit of FIG. 9. Here, provision is also made in the shaft 640 for the interchangeable accumulator unit and serves as voltage supply for the portable electronic receiving unit.

The portable electronic receiving unit according to FIGS. 9 and 10 can be placed into the charging box 530 according to FIGS. 7 and 8 so as to charge the interchangeable accumulator unit. In such a case, the electrical contacts 535 come into contact with the electrical contact surfaces 511 so that the interchangeable accumulator unit in the portable electronic receiving unit is charged via the charging contact surfaces at its front side.

The invention claimed is:

1. An interchangeable accumulator unit comprising a housing and at least one lithium accumulator cell arranged in the housing and a charging unit arranged in the housing for controlling the charging process of the lithium accumulator cell, wherein the housing encompasses at least a first charging contact unit and a second charging contact unit separate from the first charging contact unit,
    wherein each of the charging contact units comprises four charging contact surfaces,
    wherein each of the four charging contact surfaces of the first charging contact unit is electrically connected to a coupled charging contact surface of the second charging contact unit so that a charging of the accumulator unit can be performed over the first and alternatively over the second charging contact unit,
    wherein a first charging contact surface of the first and the second charging contact units provide an electrical ground, a second charging contact surface of the first and the second charging contact units provide a positive connection for connecting a charging voltage for the charging unit, and a third charging contact surface of the first and the second charging contact units provide a positive connection for connecting a supply voltage for the accumulator cell.

2. The accumulator unit according to claim 1, wherein the housing comprises at least a lower side and a front side, wherein the first charging contact unit is arranged on the lower side of the housing and the second charging contact unit is arranged on a front side of the housing.

3. The accumulator unit according to claim 1, wherein the fourth charging contact surface of the first and the second charging contact units provide a status contact.

4. The accumulator unit according to claim 1, further comprising a display unit disposed in the housing, wherein the display unit is electrically connected to the accumulator cell, and wherein the display unit is configured to display a residual capacitance of the accumulator cell.

5. The accumulator unit according to claim 1, wherein the charging unit is embodied as a charging controller for monitoring the charging process of the lithium accumulator cell, wherein the charging circuit unit is embodied for the purpose of controlling the charging process in such a manner that a constant current and subsequently a constant voltage of the lithium accumulator cell is initially supplied.

6. A portable electronic device comprising an interchangeable accumulator unit according to claim 1.

7. A charging box for accommodating a portable electronic device comprising an interchangeable accumulator unit according to claim 6, wherein the accumulator unit located in the electronic device is charged in the charging box.

8. A charging station for charging an accumulator unit comprising a shaft for accommodating an accumulator unit according to claim 1.

9. The interchangeable accumulator unit of claim 1 further comprising a protective circuit to protect against a short circuit or an excess voltage.

10. The interchangeable accumulator unit of claim 1 further comprising a protective circuit to protect against excess ambient temperature.

11. The interchangeable accumulator unit of claim 1 further comprising a protective circuit to protect against a short circuit or an excess voltage and an excess ambient temperature.

* * * * *

UNITED STATES PATENT AND TRADEMARK OFFICE
CERTIFICATE OF CORRECTION

| | | |
|---|---|---|
| PATENT NO. | : 8,264,199 B2 | Page 1 of 2 |
| APPLICATION NO. | : 12/294236 | |
| DATED | : September 11, 2012 | |
| INVENTOR(S) | : Andres et al. | |

It is certified that error appears in the above-identified patent and that said Letters Patent is hereby corrected as shown below:

In the Specification:

Column 1, Line 9: please add a --,-- after "2006".

Column 1, Line 9: please delete "disclosure" and insert --disclosures--.

Column 1, Line 10: after "by reference" please insert --for all purposes--.

Column 1, Line 12: please add a --,-- after "electronic devices".

Column 1, Line 57-58: please add a --,-- after "accumulator cell".

Column 2, Line 34: please add a --,-- after "14".

Column 2, Line 36: after "1 mm" insert --and--.

Column 2, Line 37: please add a --,-- after "accumulator unit".

Column 2, Line 40: please delete "is arranged" and insert --are arranged--.

Column 2, Line 63: after "protective circuit" please insert --to protect--.

Column 2, Line 66: after "protective circuit" please insert --to protect--.

Column 3, Line 18: please delete "a LED" and insert --an LED--.

Column 3, Line 23: please delete "Volt" and insert --Volts--.

Column 3, Line 25: please add a --,-- after "20".

Column 3, Line 31: please add a --,-- after "SS".

Column 3, Line 49: after "electronic" please insert --protection device to protect--.

Column 3, Line 53: please delete "Volt" and insert --Volts--.

Column 3, Line 65: please delete "Volt" and insert --Volts--.

Column 4, Line 4: after "is used as" please insert --as--.

Column 4, Line 23: please add a --,-- after "accumulator cell 40".

Column 4, Line 32: please add a --,-- after "charging station".

Column 4, Line 38: please add a --,-- after "510".

Signed and Sealed this
Eighth Day of January, 2013

David J. Kappos
*Director of the United States Patent and Trademark Office*

Column 4, Line 42: please delete "changing" and insert --charging--.

Column 4, Line 51: please add a --,-- after "accumulator unit".

Column 4, Line 52: please add a --,-- after "embodiment".

Column 5, Line 2: after "receiving unit" please insert --600,--.

Column 5, Line 20: please add a --,-- after "530".

Column 5, Line 21: please add a --,-- after "7 and 8".

In the Claims:

Column 6, Line 26, Claim 5: please delete "is" and insert --are--.